US007357892B2

(12) United States Patent
Betti et al.

(10) Patent No.: US 7,357,892 B2
(45) Date of Patent: Apr. 15, 2008

(54) METHOD OF MANUFACTURING CYLINDER WITH INTERCHANGEABLE SLEEVE

(75) Inventors: Giulio Betti, Lucca (IT); Fabrizio Lorenzi, Lucca (IT); Walter Di Nardo, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 440 days.

(21) Appl. No.: 10/496,570

(22) PCT Filed: Nov. 20, 2002

(86) PCT No.: PCT/IT02/00734

§ 371 (c)(1),
(2), (4) Date: May 24, 2004

(87) PCT Pub. No.: WO03/045680

PCT Pub. Date: Jun. 5, 2003

(65) Prior Publication Data

US 2004/0242392 A1 Dec. 2, 2004

(30) Foreign Application Priority Data

Nov. 26, 2001 (IT) ............................ FI2004A0224
Aug. 23, 2002 (IT) ............................ FI2002A0160

(51) Int. Cl.
*B29C 63/18* (2006.01)
*B29C 39/10* (2006.01)

(52) U.S. Cl. ........................................ 264/262; 492/52

(58) Field of Classification Search ................ 264/262; 492/52

See application file for complete search history.

(56) References Cited

U.S. PATENT DOCUMENTS

| | | | | |
|---|---|---|---|---|
| 3,451,112 | A * | 6/1969 | Geiger et al. | 156/187 |
| 4,144,813 | A | 3/1979 | Julian | |
| 4,461,663 | A * | 7/1984 | Tachibana et al. | 156/86 |
| 5,096,527 | A | 3/1992 | Biagiotti | |
| 5,216,954 | A * | 6/1993 | Thompson | 101/375 |
| 6,030,328 | A * | 2/2000 | Watanabe et al. | 264/262 |
| 6,053,232 | A | 4/2000 | Biagiotti | |
| 6,915,570 | B1 * | 7/2005 | Ohgoshi et al. | 264/262 |
| 7,135,137 | B2 * | 11/2006 | Nakayama et al. | 264/262 |

FOREIGN PATENT DOCUMENTS

| | | |
|---|---|---|
| DE | 509 605 C | 10/1930 |
| EP | 0 000 410 A1 | 1/1979 |
| EP | 0 009 360 A1 | 4/1980 |
| EP | 0 181 726 A2 | 5/1986 |
| EP | 0 181 726 A3 | 5/1986 |
| EP | 0 836 928 A1 | 4/1998 |
| WO | WO 99/44814 | 9/1999 |

* cited by examiner

*Primary Examiner*—Jill L. Heitbrink
(74) *Attorney, Agent, or Firm*—Breiner & Breiner, LLC

(57) ABSTRACT

The rotating cylinder comprises: an elongated inner core (12) which is substantially rigid and an interchangeable sleeve (45) which is fitted onto the core; the sleeve is axially and angularly constrained to said core and is provided on its external surface with a raised pattern. The internal surface of the interchangeable sleeve and the external surface of the inner core are conical surfaces which are mutually complementary; axial and angular locking of the interchangeable sleeve and the inner core is achieved by the friction between the conical surfaces which are forced axially one onto the other.

12 Claims, 7 Drawing Sheets

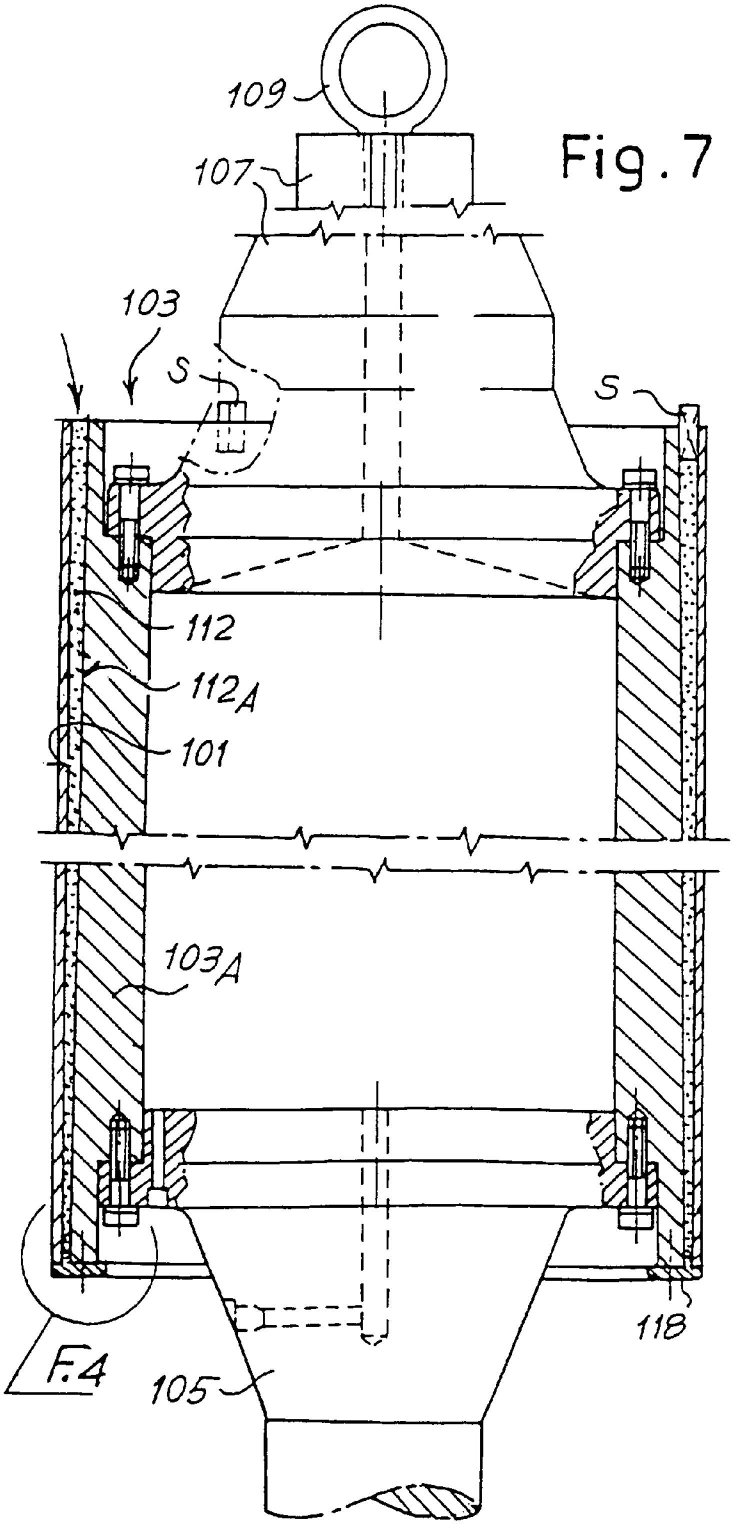
Fig. 7
Fig. 8
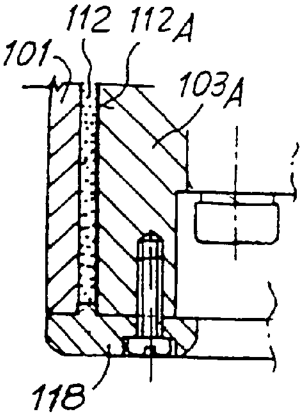

METHOD OF MANUFACTURING CYLINDER WITH INTERCHANGEABLE SLEEVE

TECHNICAL FIELD

The present invention relates to a rotating cylinder for processing a web-like material, and in particular but not exclusively to an embossing cylinder for embossing materials in sheet form, such as tissue paper or the like. More particularly, the invention relates to a rotating cylinder of the type comprising a substantially rigid, central, inner core on which an interchangeable sleeve is fitted.

The invention also relates to a device comprising at least one rotating cylinder of the abovementioned type, for example an embossing unit or a printing unit.

The invention also relates to an interchangeable sleeve for a rotating cylinder, in particular an embossing cylinder or a printing cylinder of the type mentioned above.

According to a further aspect, the invention relates to a method for manufacturing embossing cylinders or similar cylinders, such as printing cylinders, for the processing of strip-like materials, such as paper, tissue-paper or the like.

STATE OF THE ART

In the paper converting industry and in other industries where continuous web-like materials are processed, various transformation and processing operations are performed on these materials by means of rotating cylinders which act on the web-like material. Among these processing operations, particularly important for the purposes of the present invention are those processing operations involving printing and embossing. During processing of tissue paper for the production of rolls of toilet paper, rolls of multipurpose drying paper, paper handkerchiefs and serviettes and the like, it is usual for the paper material to undergo a mechanical embossing operation which deforms or breaks the fibers so as to increase the absorbent capacity of the material, its volume and its softness.

Embossing is also used to impart a particular decorative effect to the web-like material.

Embossing devices for these purposes are described for example in U.S. Pat. No. 6,053,232, U.S. Pat. No. 5,096,527 and WO-A-9944814.

One of the problems which arises in this particular technology consists in the need to change the embossing patterns with a certain frequency, when passing from one production batch to another one, so as to adapt to the varying characteristics of the material used, in order to satisfy different requirements and/or markets.

Similar problems arise during the printing of web-like material, in particular paper material. In this case also it is required to replace the patterns with a certain rapidity.

Conventionally the embossing cylinders consist of a single block made of steel or other hard material suitable for withstanding the high flexural stresses without excessive deformation. The external surface of the cylinder is engraved mechanically, chemically, by means of laser, or by some other system, in order to produce the embossing pattern, consisting essentially of a combination of points or protuberances of varying shape which process the web-like material which passes between the embossing cylinder and a pressure roller, or between two embossing cylinders with complementary patterns.

Replacement of the embossing pattern in this case requires replacement of the entire cylinder. The costs of the cylinder and the engraving operations are extremely high.

This means that, in order to have a certain number of interchangeable embossing patterns available, it is required to stock a corresponding number of high-cost cylinders and particularly time-consuming operations are also required of personnel in order to replace the cylinders with a consequent loss of production due to the machine downtime.

In order to overcome this drawback, systems for facilitating replacement of the pattern on the embossing cylinder have been developed. EP-A-0836928 describes an embossing device where the embossing cylinders consist of an elongated inner core on which an interchangeable sleeve is fitted. This sleeve is provided with an embossing pattern. The interchangeable sleeve is elastic and may expand diametrally in order to facilitate insertion and removal onto/from the central core of the cylinder. Insertion and removal of the sleeve are facilitated by a compressed-air system which has the function of expanding the interchangeable sleeve in order to facilitate extraction thereof from the core or in order to facilitate insertion thereof.

This system is also used in printing cylinders in order to replace the cliché formed on an interchangeable sleeve. Printing cylinders of this type are described in EP-A-0181726, EP-A-0009360 and U.S. Pat. No. 4,144,813.

One of the drawbacks which arises in this type of solution, and in particular in the embossing sector, consists in the tendency of the sleeve to slip or roll on the central core of the cylinder. This is a result of the elasticity of the material used, the tangential stresses applied and the heating action to which these mechanical parts are subject during operation. This slipping effect results in problems of wear and, in particular in double units, in a phase-displacement in the relative position of the incisions on the two embossing rollers. In order to prevent angular displacement of the interchangeable sleeve with respect to the cylinder core, form-fitting arrangements consisting of longitudinal grooves and longitudinal ribs on the two components forming the cylinder have been developed. This solution however is not satisfactory in particular when the interchangeable sleeve is made of fiberglass. The presence of continuous glass fibers arranged helically in the body of the sleeve prevents the formation of grooves or incisions as well as reliefs. The sleeve must have a smooth internal surface.

OBJECTS AND SUMMARY OF THE INVENTION

The object of the present invention is to provide a rotating cylinder for processing a web-like material, and in particular an embossing cylinder, of the type with an interchangeable sleeve which does not have the drawbacks of conventional cylinders.

These and further objects and advantages, which will become clear to persons skilled in the art from the reading of the text which follows, are essentially obtained with a rotating cylinder comprising:

- a substantially rigid, elongated, inner core with two ends and an external surface;
- and an interchangeable sleeve with an internal surface, which is fitted onto said core, said sleeve being axially and angularly constrained to said core and being provided on its external surface with a raised pattern, characterized in that the internal surface of the interchangeable sleeve and the external surface of said inner core are conical surfaces which are mutually complementary and in that axial and angular locking together of the interchangeable sleeve and the inner core is achieved by the friction between the conical surfaces which are forced axially one onto the other.

In this way, a secure and reliable fit is obtained. Moreover, this type of fit allows advantageously the interchangeable sleeve to be made of substantially rigid material and avoids the use of compressed air for expanding the sleeve so as to facilitate extraction and insertion from/onto the central inner core. The rigidity of the sleeve eliminates the problem of relative rolling or slipping of the sleeve and central inner core.

Moreover, since it is not required to use elastically yielding materials in order to form the interchangeable sleeve, the latter may be formed with a central component consisting of carbon fiber or carbon-fiber reinforced polymerized resin. This material allows the application of a metallic layer on the external surface of the interchangeable sleeve. In this way it is possible to manufacture sleeves with raised patterns which are made of metal and are therefore particularly hard and wear-resistant and advantageous for use in embossing cylinders.

U.S. Pat. No. 4,144,813, EP-A-0,009,360, EP-A-0,181,726 describe printing cylinders with a clichéin the form of an interchangeable sleeve which is fitted onto a substantially rigid central inner core. The external surface of the central core is frustoconical and the internal surface of the interchangeable sleeve has a conical progression complementing the surface of the central core. However, in this case, the interchangeable sleeve is elastically deformable in the radial direction and locking thereof on the core occurs not by means of mechanical forcing, following relative sliding of the two conical surfaces, but as a result of the elastic gripping performed by the material of the sleeve on the central core. The conicity of the two complementary surfaces of the core and the sleeve has exclusively the function of allowing partial insertion, without effort, of the sleeve onto the core until the front edge of the sleeve closes the orifices which are formed on the surface of the central core and through which air under pressure is introduced so as to expand subsequently the external sleeve and allow complete insertion thereof onto the core. Once this insertion has been performed, owing to the expansion which the interchangeable sleeve undergoes, the pressure inside the central core is eliminated so as to allow tightening of the interchangeable external sleeve which, as a result of its elasticity, is axially and angularly locked onto the core. It is obvious that in these solutions of the conventional type, however, there is no guarantee as to angular locking of the interchangeable sleeve with respect to the core in the event of absence of the elasticity characteristics of the sleeve and/or in the case where there is a differential expansion of the sleeve with respect to the core owing to the increase in temperature, and/or owing to the presence of high tangential stresses.

According to an advantageous embodiment of the invention, the cylinder comprises a keying member which can be engaged on the tapered end of said core, so as to push and force said interchangeable sleeve onto said core. The keying member may be pushed against the interchangeable sleeve by means of locking screws. Alternatively, it is possible to envisage actuators for performing this operation, for example mechanical, hydraulic or pneumatic actuators.

In a preferred embodiment, the keying device comprises an annular flange and an annular collar integral therewith and cooperating with the edge of the interchangeable sleeve corresponding to the thicker end of said interchangeable sleeve.

The cylinder may also comprise an extractable member which can be engaged on the front of said core at the end of said core opposite the tapered end, so as to exert a force for releasing the interchangeable sleeve from said core.

The extractor may also be actuated by means of locking screws or by means of a suitable actuator.

According to a further aspect. It is an object of the invention to provide interchangeable embossing sleeves or sleeves for similar uses, by means of a simple and easily repeatable method.

According to the invention, a method is provided, including the steps of:

- providing a non-cylindrical central core having a cross-section with dimensions gradually increasing from an end with a minimum cross-section to an end with a maximum cross-section;
- fitting onto said core a cylindrical sleeve having a substantially cylindrical external surface and an internal surface, leaving an interstice between the internal surface of said sleeve and the external surface of said core, centering said sleeve and said core relative to each other;
- introducing a hardening resin, for example a polymerizable resin, or other fluid hardening material into said interstice so as to form a layer of resin;
- extracting axially with respect to each other said sleeve, with the layer of resin or other hardened material adhering to it, and said core.

"External processing surface" is understood as meaning a surface intended to act on the web-like material so as to perform thereon an action or a processing operation, for example a printing or embossing operation or any other operation. The processing surface of the sleeve will be treated, engraved or in any case machined so as to have the necessary mechanical characteristics, for example and in particular so as to have reliefs, protuberances or pointed parts intended to perform the embossing operations on the web-like material.

Advantageously it is possible to envisage that the core has a substantially frustoconical external surface and that said sleeve has an internal surface onto which said layer of resin is applied, substantially cylindrical and with a greater diameter than the maximum diameter of the frustoconical surface of said core.

Using a same core, which basically forms the core of the embossing cylinder or other cylinder intended for the processing of a web-like material, it is possible to construct several interchangeable sleeves, which can all be perfectly mated with the core with which they have been produced. In this way it is possible to obtain a system composed of a core and a plurality of interchangeable sleeves constructed on the core itself. By combining now one or other of said sleeves with the core, composite embossing cylinders with variable patterns are obtained, since each sleeve may have its own embossing pattern.

Below reference will be made specifically to the use of the present invention for the manufacture of embossing cylinders, but it must be understood that similar advantages may also be obtained in the manufacture of cylinders intended for other forms of processing, for example printing cylinders and generally in the manufacture of cylinders for which it is advantageous to have interchangeable sleeves.

The central core, before casting, is preferably covered with a separating agent, such as a protective wax for facilitating separation of the resin layer. The surface of the central core is preferably ground so as to facilitate extraction of the sleeve also after removal of the separating agent for the operations following forming of the sleeve, described in greater detail below.

Advantageously, and for simpler execution of the method, casting of the resin may be performed in a substantially vertical condition of the assembly comprising sleeve and core centered relative to each other, with the smaller diameter end of said core directed upwards.

An annular centering and sealing flange may be placed between the cylindrical sleeve and the larger-diameter end of the core, in order to prevent the escaping of liquid resin and center the core and sleeve relative to each other. Segments centering said sleeve and the smaller-diameter end of said core may be adopted at the end positioned at the top, for casting of the resin, which may be performed between spaced segments.

Advantageously, according to a further development of the present invention, after hardening of the resin, the external surface of the sleeve is ground and then engraved so as to produce embossing reliefs or the like on its external surface. Grinding and engraving may be performed directly after hardening, without removing the sleeve from the core. Alternatively, it is possible to extract the sleeve with the layer of resin adhering to it from the core and then reinsert the sleeve onto the core, if necessary after cleaning the surface of the core, in order to eliminate residues of the separating agent or other material.

The hardening resin may be advantageously a dual-component epoxy resin. Another aspect of the invention consists in an interchangeable sleeve of an embossing cylinder or the like for processing a web-like material, which comprises a layer of resin on its internal surface, the internal surface of which layer of resin reproduces negatively the non-cylindrical surface of a core forming part of the embossing cylinder.

The internal surface of the layer of resin may be a conical surface with an inclination ranging from 3:1000 to 5:1000 and in particular in the region of 4:1000.

Yet another aspect of the invention consists in a cylinder, for example an embossing cylinder for processing paper products, or other cylinder for processing web-like materials, comprising a core and cylindrical tubular sleeve fitted around said core, in which: said core extends with a non-cylindrical surface having a cross-section with dimensions gradually increasing from an end with a minimum cross-section to an end with a maximum cross-section; said sleeve comprises a tubular jacket with a cylindrical external surface; to the internal surface of said tubular jacket there is fixed a layer of hardened resin, the internal surface of which corresponds negatively to that of the core to which it is joined by means of axial forcing.

Further characteristic features of the cylinder and the interchangeable sleeve according to the invention are indicated in the accompanying claims.

BRIEF DESCRIPTION OF THE DRAWINGS

The invention will be better understood with reference to the description and the attached drawing which shows a practical non-limiting example of the invention itself. In the drawing:

FIG. 7 shows the embossing cylinder assembly in the vertical condition for casting of the hardening resin;

FIG. 8 shows an enlarged detail of the zone indicated by the arrow F4 in FIG. 7, illustrating a detail of the flange for relative centering of the core and the sleeve so as to allow casting of the resin in the interstice between them;

DETAILED DESCRIPTION OF THE PREFERRED EMBODIMENTS OF THE INVENTION

A first embodiment of the invention will now be described with reference to FIGS. 1 to 4.

Figure 1:
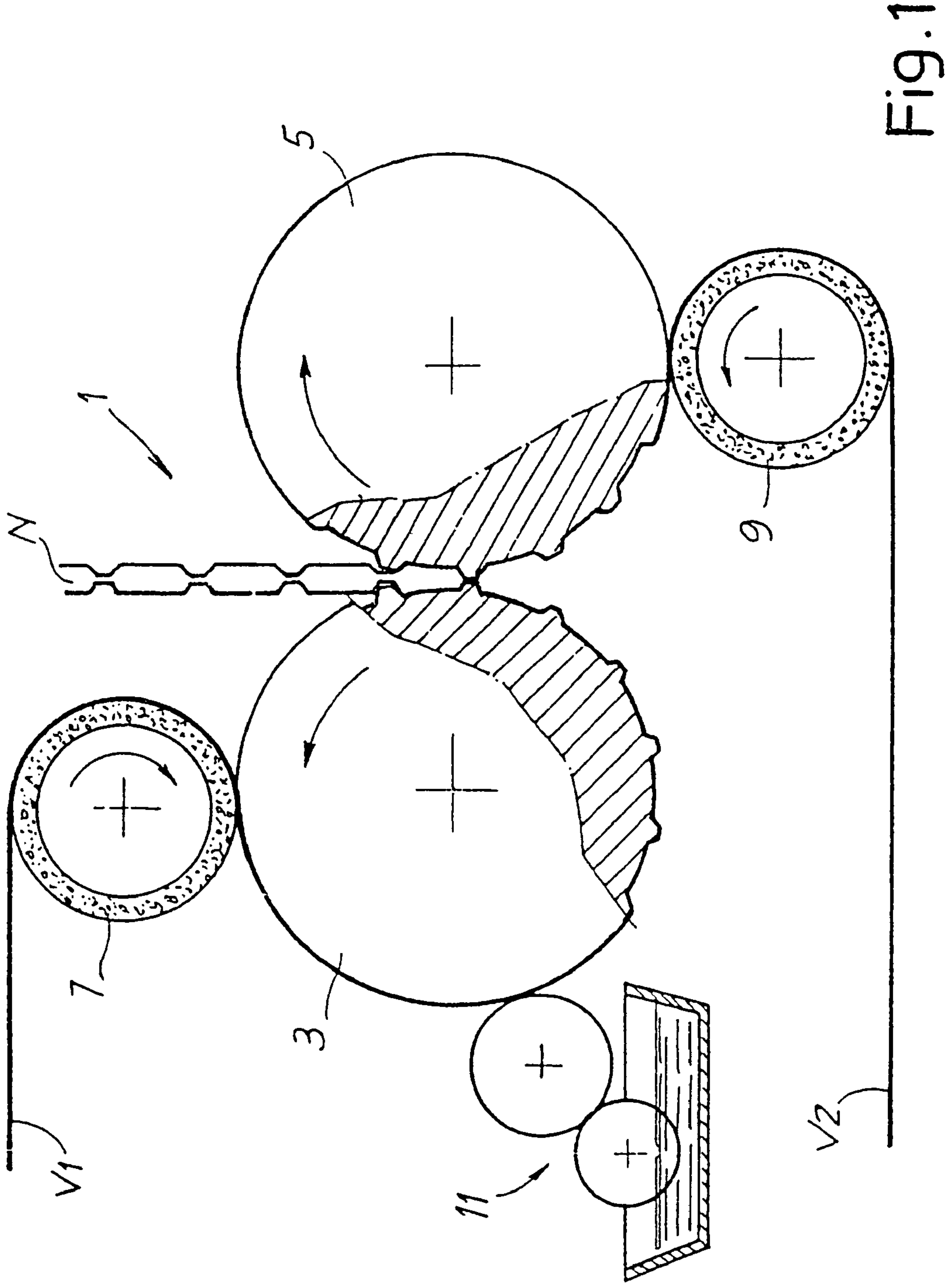
FIG. 1 shows schematically an embossing unit in which the present invention may be used.

FIG. 1 shows in very schematic form an embossing unit, generally indicated by 1, in which the present invention may be used. It must however be understood that the principles underlying the invention may also be applied in the manufacture of embossing cylinders intended for embossing units of another type, for example "nested" units or also individual embossers. Moreover, the invention may also be used for the manufacture of cylinders for processing web-like materials, able to perform operations other than embossing, for example printing or other processing operations which require rapid replacement of an interchangeable sleeve fitted onto the cylinder, whenever problems of angular slipping between interchangeable cylinder and central core of the cylinder occur.

The embossing unit 1 is of the so-called tip-to-tip type and has a first embossing cylinder 3 and a second embossing cylinder 5 each equipped with an interchangeable sleeve. The structure of the embossing cylinders is described in detail below. The embossing pattern, consisting of a plurality of protuberances, is formed on the external surface of the embossing cylinders. The embossing cylinders 3 and 5 cooperate with respective pressure rollers 7 and 9. A first ply of web-like material, indicated by V1, passes between the pressure roller 7 and the embossing cylinder 3 and is embossed there. A second ply, which is indicated by V2, is embossed between the pressure roller 9 and the embossing cylinder 5. In the gap between the embossing cylinders 3 and 5 the two embossed plies are laminated and joined together so as to form the web-like material N. Joining is obtained by means of glue applied by a glue dispenser 11.

The structure of the embossing unit described briefly here is known per se and will not be described in greater detail in this context.

Figure 2:
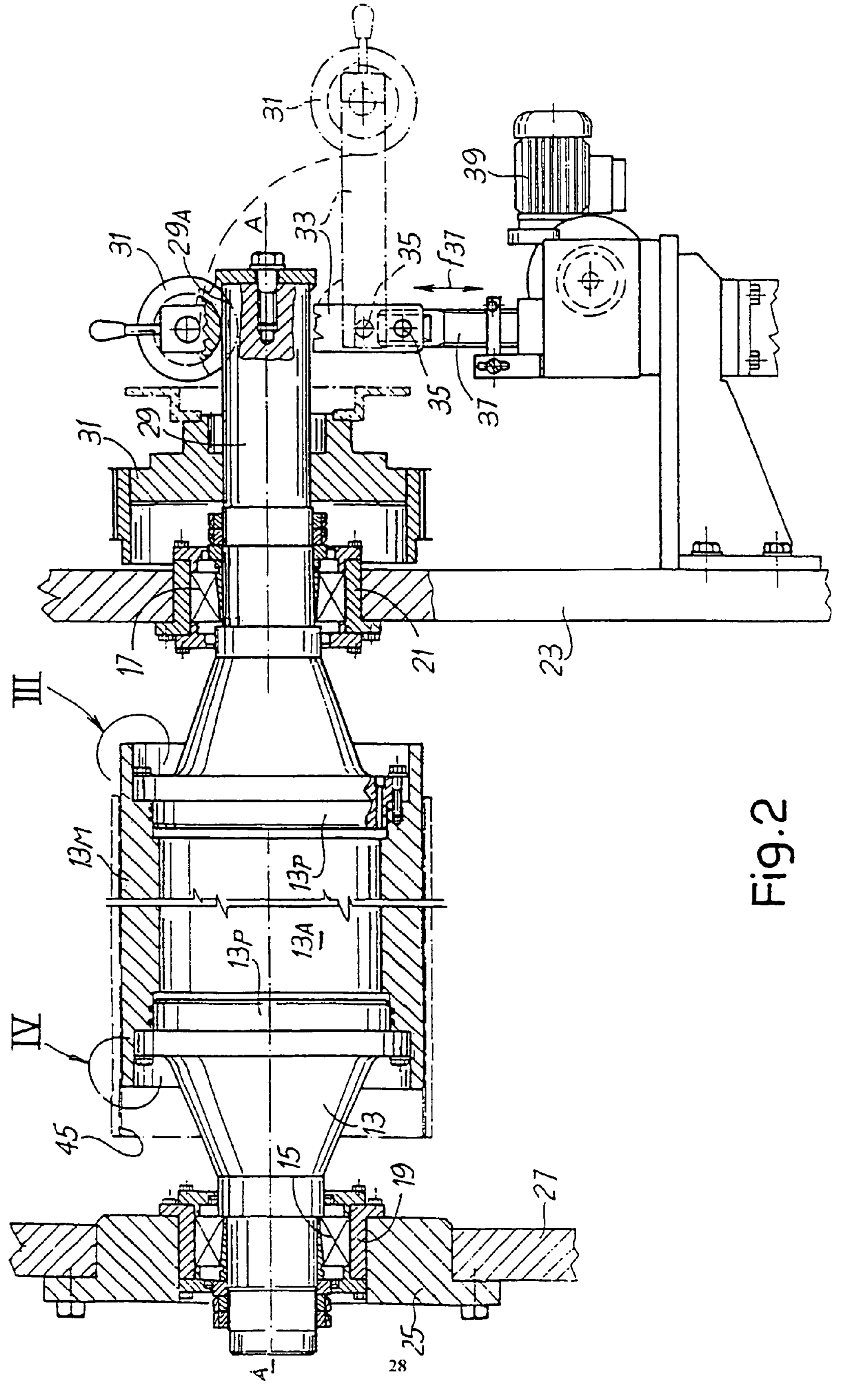
FIG. 2 shows a partly longitudinally sectioned side view of an embossing cylinder.

FIG. 2 shows one of the two embossing cylinders 3, 5. The latter may be substantially equivalent to each other and therefore only one of them, and in particular the cylinder 3, will be described in greater detail. Said cylinder has a central core 13 extending along the axis of the embossing cylinder and supported at its end by bearings 15 and 17 which are seated in bushes 19 and 21. In the example shown, the core 13 is formed by two flanged end sections 13P, 29 which close and support a jacket 13M having a nearly cylindrical configuration. In fact, the external surface of the jacket 13M has a conical progression with a very slight conicity, not shown in FIG. 2. For example, the reduction in the diameter of the cross-section may be about 1 mm per meter of axial length. The two end sections are inserted inside the bearings 15 and 17.

The bush 21 is mounted directly in a sidewall 23 of the embossing unit, while the bush 19 is inserted inside a flange 25 constrained to the second sidewall 27 of the embossing unit and able to be detached therefrom. The core 13 extends beyond the bearing 17 with its end section 29 on which a pulley 31 providing the movement to the embossing cylinder is keyed. The end section 29 extends beyond the pulley 31 so as to form an end 29A which can be engaged by a bracket 33 which is hinged at 35 to a tie-rod 37 movable vertically in the direction of the arrow f37 upon actuation of an actuator 39. FIG. 2 shows the two positions which the bracket 33 may assume. In the first position, shown in continuous lines, the bracket 33 is situated in the vertical condition and engages by means of a shaped roller 41 with the end 29A of the end section 29. When the bracket 33 is in this position, it acts on the actuator 39 until it relieves the bearing contained inside the bush 19 entirely of the weight of the cylinder. At this point the flange 25 may be removed and the embossing cylinder 3 may be retained projecting from the sole support 17, so that replacement of the interchangeable sleeve may be performed in the manner described below. In the position shown in broken lines the bracket 33 is situated in the horizontal position and the embossing cylinder 3 is able to rotate about its axis indicated by A-A.

An interchangeable sleeve, denoted generally by 45, is mounted on the core 13 of the embossing cylinder 3. The external diameter of the interchangeable sleeve 45 is smaller than the hole which remains free in the sidewall 27 after the flange 25 has been extracted from it. In this way, by engaging the cylinder 3 by means of the bracket 33 and removing the flange 25 (the cylinder 3 therefore being supported cantileverly), it is possible to extract the sleeve 45 from the core 13 and replace it with another one.

Figure 3:
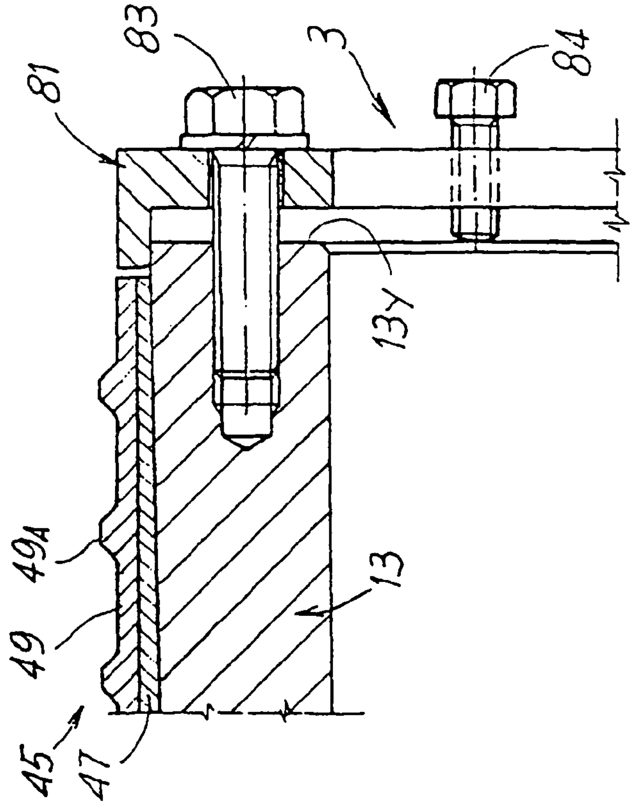
FIGS. 3 and 4 show an axially sectioned view of enlarged details of the two opposite ends of the cylinder.
Figure 4:
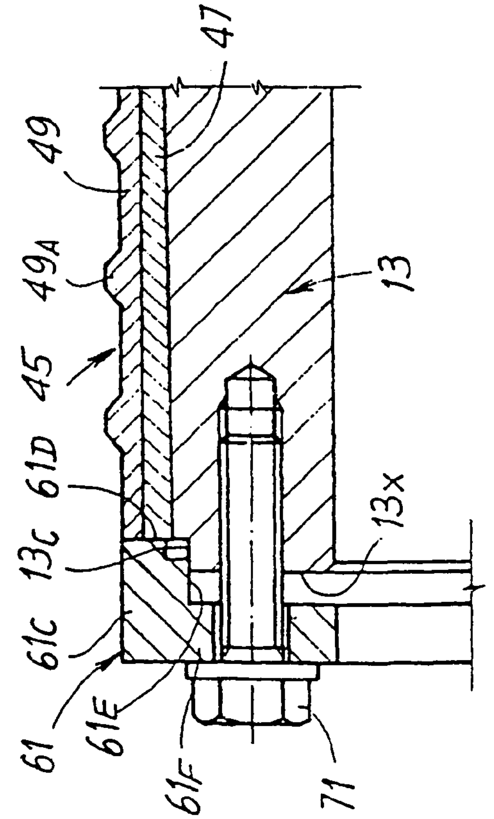
Figure 5:
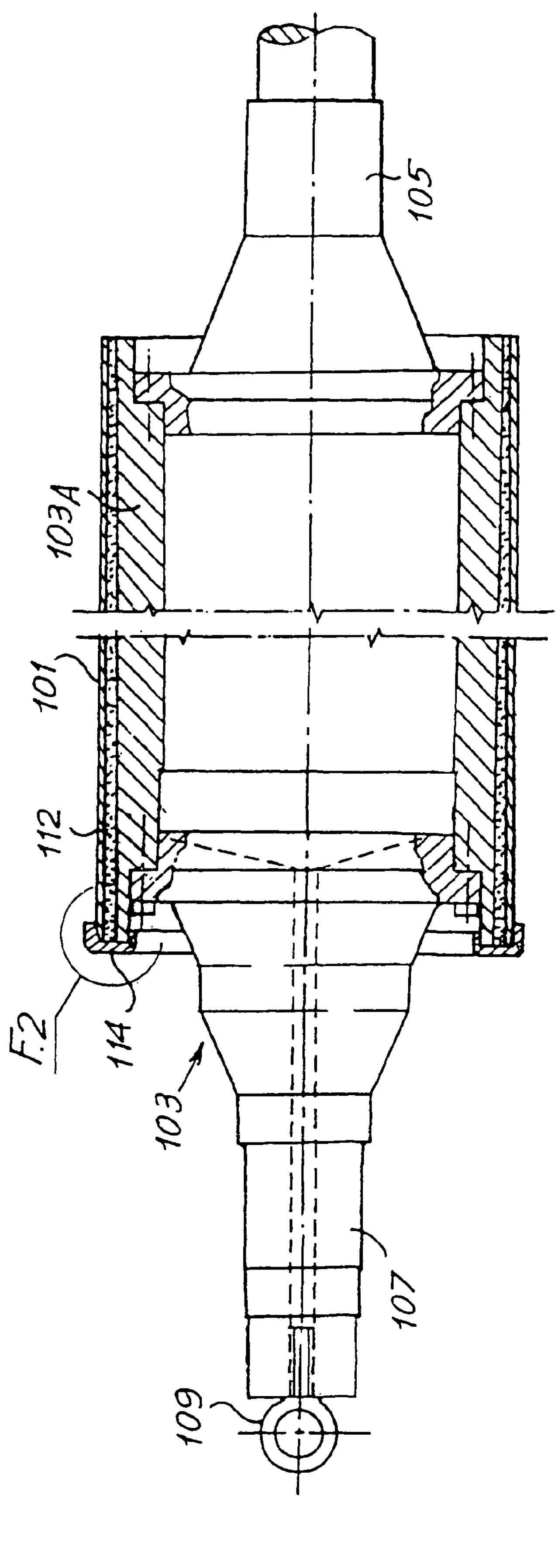
FIG. 5 shows a cross-sectional view of an embossing cylinder for paper products, provided in accordance with the invention.

The interchangeable sleeve 45 consists of two concentric components, which are visible in particular in the cross-section of FIGS. 3 and 4 which shows an enlarged view of a detail of the two ends of the embossing cylinder according to FIG. 2 with the interchangeable sleeve mounted and locked on the inner core 13. The components forming the interchangeable sleeve 45 are indicated by 47 and 49 respectively. The internal component 47 is made advantageously of carbon fiber, i.e. with a structure formed by a helically distributed arrangement of carbon fibers in a polymerized resin matrix. The external component 49 instead consists of a metal lining which is formed, for example by means of galvanic or plasma process, on the internal component. 49A denotes the protuberances formed on the external surface of the interchangeable sleeve and therefore made of the material forming the external component 49 of said sleeve. The structure of the sleeve is therefore substantially rigid. "Rigid" is understood as meaning a structure which does not expand diametrally in an appreciable manner if forced for example with the introduction of pressurized air as occurs in conventional systems for assembly of interchangeable sleeves made of fiberglass.

FIGS. 3 and 4 show an enlarged view of the details III and IV of the two opposite ends of the embossing cylinder 3. As can be clearly seen in FIGS. 3 and 4, the inner core 13 of the embossing cylinder 3 has a frustoconical external surface with the smaller base directed towards the side on which the removable flange 25 is situated, said flange being removed when it is required to perform replacement of the interchangeable sleeve. Correspondingly, the interchangeable sleeve 45 has a complementary conical inner surface and therefore a maximum internal diameter at the end which is first fitted onto the core 13. In the assembled condition, the end of the interchangeable sleeve 45 with the smaller internal diameter is situated on the side directed towards the support 15 of the cylinder 3. FIG. 3 shows the end of the embossing cylinder 3 corresponding to the support 15 and therefore the end where the core 13 has a smaller diameter. FIG. 4 shows the opposite end.

An annular shaped keying device indicated by 61 engages on the front surface 13X, corresponding to the smaller diameter end of the inner core 13. The keying device 61 has an annular flange 61F and an annular collar 61C with a front surface 61D and internal cylindrical surface 61E. The front surface 61D forms a surface bearing against the corresponding edge of the interchangeable sleeve 45, i.e. against the thicker edge corresponding to the end of the sleeve 45 having a smaller internal diameter. The cylindrical surface 61E forms a guiding surface on a corresponding cylindrical surface 13C formed on the end of the core 13.

The keying member consisting of the ring 61 is clamped by means screws 71 on the core 13 and pushed against the edge of the interchangeable sleeve 45 so as to force the latter against the core 13, obtaining a form fit owing to the complementary conical surfaces of the core 13 and the interchangeable sleeve 45. Once this fit has been obtained by means of sliding and forcing of the sleeve 45 onto the core 13, the annular keying member 61 may also be removed from the embossing cylinder by removing the screws 71.

FIG. 4 shows an extraction member which is generically denoted by 81 and mounted on the embossing cylinder. The axial dimension of the extraction member is such as to prevent it from being touched by the corresponding edge of the interchangeable sleeve 45. In practice the relative position of the extraction member 81 and the interchangeable sleeve 45, when it has been forced onto the core 13, is that shown in FIG. 4. This prevents any forcing of the sleeve 45 against the extraction member 81 from causing loosening of the grip of the sleeve 45 on the core 13.

The extraction member 81 is locked frontally by means of screws 84 pressing on the front surface 13Y of the inner core 13 by means of traction screws 83 engaging inside threaded holes in the jacket of the cylinder 13. These screws are also used to push the extraction member 81 against the corresponding edge of the interchangeable sleeve 45 following loosening of the screws 84. In this way the sleeve 45 is pushed until it is separated from the core 13, sliding axially along it in the opposite direction to the direction in which it was fitted and forced onto the core 13. It is clear that this operation will be performed following removal of the keying member 61 illustrated in FIG. 3.

A further embodiment of the invention, including a novel method of manufacturing an embossing cylinder with a removable sleeve is disclosed herein after with reference to FIGS. 5 to 10.

In accordance with that illustrated in the accompanying drawing, 101 denotes a tubular sleeve or jacket which is made of metal (or other material with suitable mechanical characteristics, in particular as regards hardness and resistance, especially compression and wear resistance) and on which an embossing pattern consisting of a series of protuberances having a geometric shape or also of a more complex nature may be engraved. These protuberances have the function of performing embossing of a web-like material, for example a paper material.

103 denotes a core which has characteristically a central section 103A which is non-cylindrical and in particular frustoconical, where ΦA indicates the maximum diameter at one of the ends and ΦB indicates the minimum diameter at the other end. Said section 3A of the core 103 may have a shape different from a frustoconical one, provided that it is such as not to impede engagement, by means of axial sliding, with the sleeve and has preferably circular cross-sections. Generally, the core will have a shape such that its cross-section increases gradually from a minimum cross-section at a first end to a maximum cross-section at the opposite end.

The core 103 extends with a neck portion 105 emerging from the larger-diameter end ΦA and with a neck portion 107 emerging from the smaller-diameter end ΦB. The neck portion 107 may be equipped with a removable ring or eyelet 109 for performing maneuvers as described hereinbelow.

The cylindrical jacket forming the main part of the sleeve 101 has a cylindrical internal surface with an internal diameter ΦC which is not smaller than and especially to a limited extent greater than the maximum diameter ΦA of the larger base of the section 103A of the core 103.

The sleeve 101, in order to be mounted on and engaged with the core 103, 105, 107, must be equipped with an internal layer 112, the surface 112A of which has a negative progression corresponding to the surface of the section 103A of the core 103. In other words, if the section 103A has a frustoconical shape, the internal surface 112A of the cavity of the sleeve 101 will have a complementary frustoconical shape.

The layer 112 is made of a hardening synthetic resin, which may advantageously be a dual-component epoxy resin such as, for example, that known commercially by the name "ARALDITE CW 2215" produced by Vantico Ltd (Great Britain) and able to harden by means of polymerization and/or crosslinking or other equivalent processes, over a suitable period of time, for example 24 hours, with or preferably without the supply of external energy in order to favor the hardening process. The maximum internal diameter D1 of the internal surface 112A of the layer 112 of resin corresponds to the diameter ΦA of the zone 103A of the core 103, while the minimum internal diameter D2 of said surface 112A corresponds to the minimum diameter ΦB of said zone 103A of the core 103.

Figure 6:
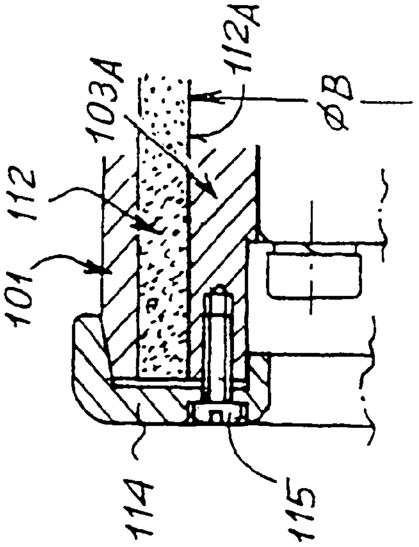
FIG. 6 shows an enlarged detail of the zone indicated by the arrow F2 in FIG. 5, showing a flange for locking the sleeve on the core during use of the cylinder.
Figure 9:
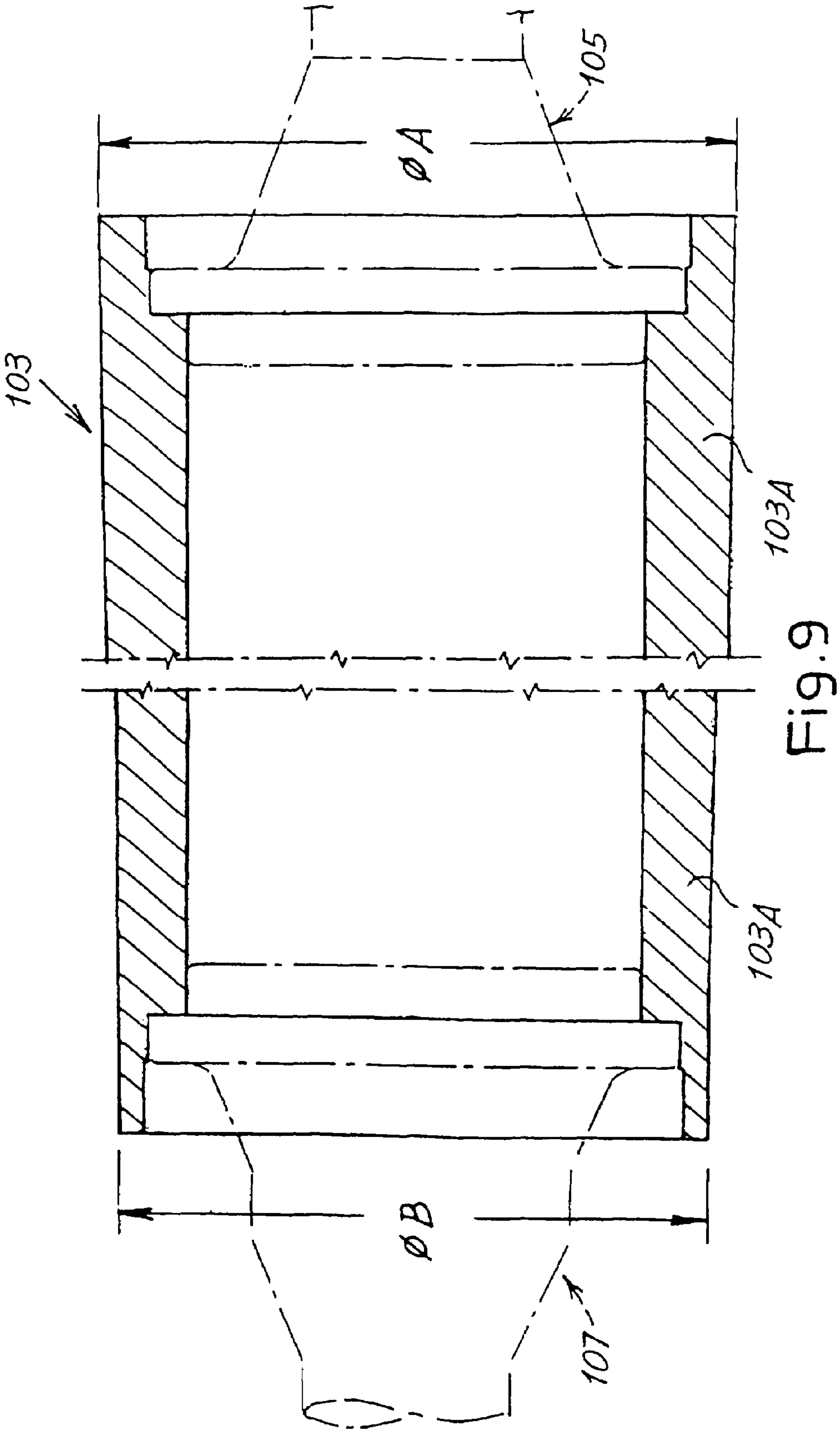
FIGS. 9 and 10 show, in isolation and limited to the end portions, the frustoconical core and the sleeve with the hardened resin layer adhering to the sleeve itself.
Figure 10:
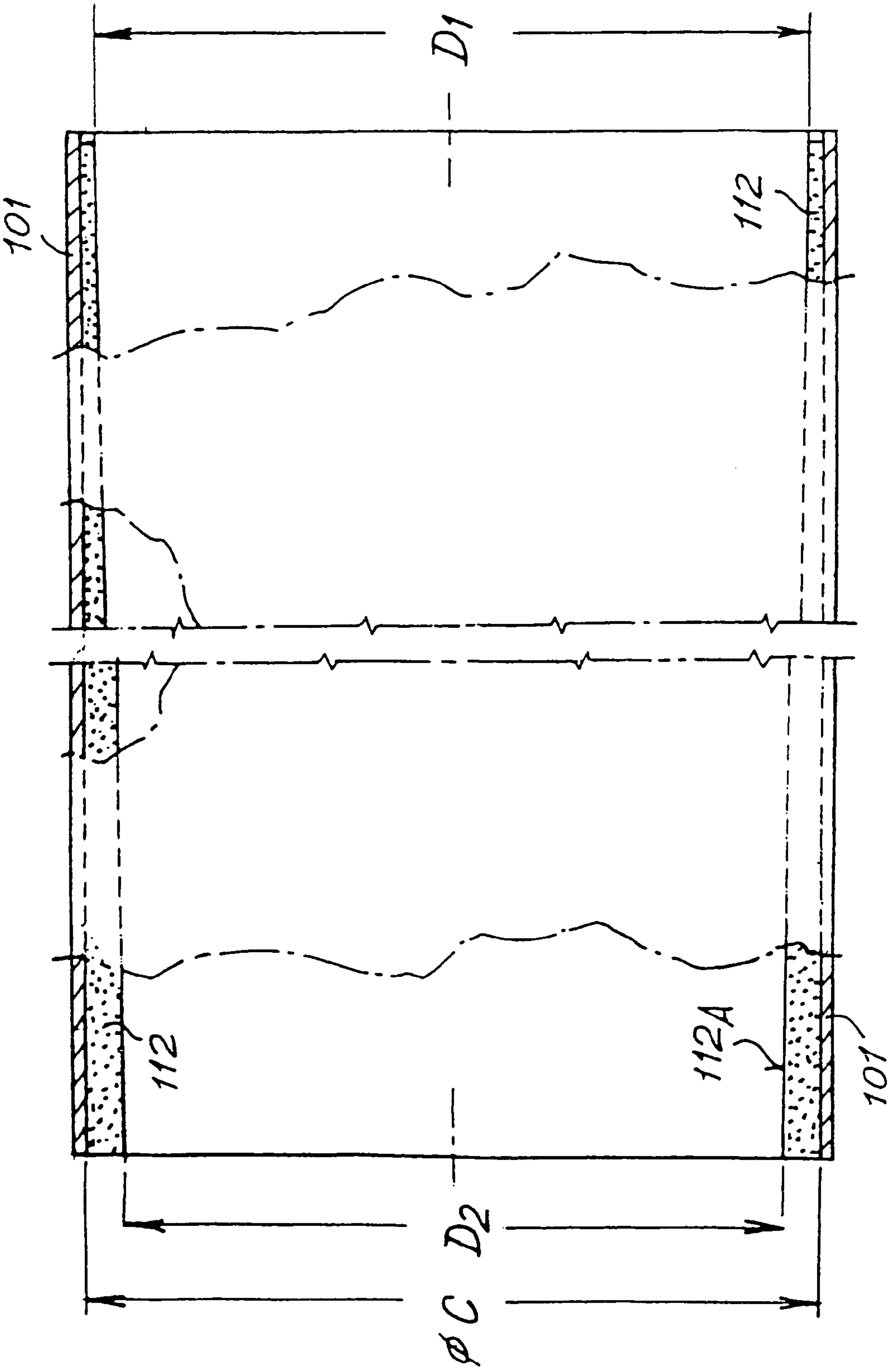

The structural form of the zone 103A of the core 103 and the structural form of the internal surface 112A of the layer 112 of the sleeve 101 must correspond perfectly. In this case the sleeve 101 may be fitted onto the zone 103A of the core 103 and forced there so as to ensure the mutual stability of the core and sleeve, i.e. relative axial and angular locking. This may be obtained advantageously by means of conicity of said internal frustoconical surface 112A of the layer 112 and external frustoconical surface of the zone 103A, which may have an inclination of 4:1000. However, in order to ensure stable engagement of the sleeve 101 on the core 103, 103A it is possible to envisage (see FIGS. 5 and 6) mounting, on the front of the smaller-diameter end ΦB of the core 103, 103A, a flange 114 which is applied to the core 103 and embraces the terminal edge of the sleeve 101. This flange prevents in any case relative axial sliding of the core and the sleeve 101. Mounting of this flange 114 is performed by means of screws 115 engaged on the end of the core 103. The flange 114 stresses the sleeve 101, 112 on the core 103, 103A in the opposite direction to the direction of extraction, in such a way as to force said elements relative to each other. Around the terminal edge corresponding to the end where the flange 114 is mounted, the external surface of the sleeve 101 has a chamfer for example of about 10°, as shown in FIG. 6, cooperating with a corresponding complementary frustoconical surface formed on an annular projection of the flange 114. In this way, radial forcing of the sleeve 101, 112 against the external surface of the core 103, 103A is also obtained.

A possibility which is not excluded is that of also arranging a locking flange at the opposite end, or an extractor which, stressing the sleeve 101, 112 axially with respect to the core 103, 103A in the direction of extraction, facilitates disassembly thereof, releasing from each other the complementary conical surfaces, following removal of the flange 114.

The method for manufacturing the sleeve 101 formed by the metal jacket with a cylindrical external surface provided with the frustoconical layer 112 of resin envisages using the same core in order to obtain the internal surface 112A of the layer 112, thereby ensuring perfect coincidence between the male surface of the core and female surface of the sleeve.

In order to implement the above, it is envisaged arranging the core in the vertical position as shown in FIGS. 7 and 8, using advantageously the ring 109, the sleeve 101 being fitted onto the core 103, 103A and centered thereon by means of expedient measures, for example using segments S at the smaller-diameter end ΦB of the frustoconical zone 103A of the core, between the core and the edge of the sleeve. At the bottom, relative centering may be obtained with a flange 118 mounted on the larger-diameter end ΦA of the frustoconical zone 103A of the core 103. The flange 118 also has the function of closing, at the bottom, the cavity inside which the resin must be cast. For this purpose, the flange 118 has, as shown in detail in FIG. 4, two concentric annular projections, one cooperating with the internal surface of the cylindrical jacket forming the main body of the sleeve 101 and the other with the terminal edge of the frustoconical portion 103A of the core 103. Instead of using the segments S, the upper centering may be obtained with a flange which is similar to the flange 118, but provided with suitable openings for the through-flow of the fluid resin, or by means of a flange similar to the flange 118 but made in several portions, some of which are removed so as to leave space for the resin to pass through. Alternatively, however, other types of mechanical members for relative centering may be used.

When the core and the sleeve are located in the vertical position, it is possible to perform a casting of liquid resin, which occupies the entire space or interstice situated between the sleeve 101 and the frustoconical zone 103A of the core 103.

Before casting the resin, a pretreatment of the internal cylindrical surface of the core 101 may be performed in order to ensure stable adherence of the cast and hardened resin which forms the abovementioned layer 112. Conversely, treatment with a separating agent, performed on the frustoconical surface 103A of the core 103, ensures easier separation of the hardened layer 112 by means of axial extraction between the core 103, 103A and the sleeve 101. This treatment may be, for example, a treatment with a protective wax acting as a separating agent.

With hardening of the cast resin 112 so as to form the layer 112 adhering to the inside of the sleeve 101, the pair of frustoconical surfaces for engagement between the core 103, 103A and the sleeve 101 is obtained directly and with extreme precision.

The method in question allows the preparation of a plurality of sleeves for an embossing cylinder with extreme precision and extreme simplicity. It is possible to provide for the same core 103, 103A—intended to form the internal part of an embossing cylinder for an embossing unit of a plant for the treatment of paper or other web-like material—a plurality of sleeves 101, 112 which may be assembled and disassembled easily onto the core and from the core axially. By equipping (in the manner described below) each sleeve with a different embossing design on its external cylindrical surface it is possible to change the embossing pattern produced by the embossing unit by simply extracting and replacing a sleeve with another one on the same core 103 of the embossing cylinder.

It is also possible to provide a "master" core which is substantially identical, as regards the form of the frustoconical portion 103A, to the cores forming various embossing cylinders. The same "master" core will therefore be used, by the manufacturer of interchangeable sleeves, to produce interchangeable sleeves intended, for a plurality of cores forming the internal part of a corresponding plurality of embossing cylinders belonging to the same user or also to different users. In this way one or more users may request additional or replacement sleeves from the manufacturer without having to return (even temporarily) the core of their embossing cylinder.

The superficial engraving of the sleeve in order to obtain the embossing pattern may be performed at any moment. Therefore, the user who has an embossing unit equipped with an embossing cylinder comprising a core 103 and a series of interchangeable engraved sleeves, may request and/or perform on a new sleeve which is not engraved a new pattern at the time when this is required.

This thus results in the possibility of replacing rapidly an embossing pattern with another one, without having to change a complete embossing cylinder each time within the plant, but still using the same core which was used to perform the resin casting operations and the formation of different interchangeable sleeves. It is also possible to envisage interchangeable sleeves with patterns which are identical to each other, able to be replaced when a sleeve is worn. Similar advantages may be obtained with this principle, for example during the manufacture of printing cylinders.

The surface machining of the sleeve 101 in order to obtain the distribution of protuberances which form the embossing pattern may be performed using any known technique. In fact, the sleeve 101 has an external jacket with a cylindrical external surface which may be processed using conventional techniques, for example by chemical means or chip cutting.

This engraving operation may be performed after the resin forming the layer 112 has hardened completely and without extracting the sleeve 101, 112 from the core 103. Alternatively, the sleeve 101, 112 may be extracted from the core 103 and then reassembled on it and fixed by means of axial forcing, if necessary after the removal of any residues of separating agent or other material from the frustoconical surface 103A of the core 103.

In both cases, the external surface of the sleeve 101 is ground so as to ensure the concentricity thereof (within the predetermined tolerance limits) with respect to the geometric axis of the core 103, which axis also forms the axis of rotation of the embossing cylinder composed of the core 103 and the sleeve 101, 112 fitted and locked thereon. After grinding, engraving of the pattern is performed using a known technique. Finally the engraved sleeve is extracted from the core, which is ready for an optional additional process for formation of a new interchangeable sleeve having the same or a different embossing pattern.

Extraction of the sleeve 101, 112 from the core 103, 103A, removal of the separating agent and subsequent reassembly before performing the grinding and engraving operations are advantageous operations in that, during grinding and engraving of the sleeve, the latter is subjected to high stresses which tend to cause rolling of the sleeve with respect to the core. Removal of the separating agent and subsequent fixing of the sleeve on the core, if necessary with the aid of the flange 114 or other locking means, ensure that there is no angular slipping of the sleeve with respect to the core during the grinding and engraving operations.

Balancing operations may be performed on the core and also on the composite cylinder created by engagement of a sleeve 101, 112 on the core 103. In particular, it is suitable to perform balancing of the core without the sleeve and subsequently of the core and the sleeve assembled with one another and locked, so that the assembly sleeve+core is always balanced whatever the angular position in which these two components are joined together. This facilitates and simplifies greatly the subsequent use of the various interchangeable sleeves and the respective core.

It is understood that the drawing shows only one example provided solely by way of practical demonstration of the invention itself, it being possible to vary the forms and arrangements of said invention without however departing from the scope of the idea underlying the invention. The presence of any reference numbers in the accompanying claims merely has the function of facilitating reading thereof with reference to the accompanying drawings and the above text and does not limit the scope of protection thereof.

The invention claimed is:

1. Method for manufacturing an interchangeable sleeve of a cylinder for processing a web-like material, having an external processing surface, comprising:

providing a non-cylindrical central core having a cross-section with dimensions gradually increasing from an end with a smaller cross-section to an end with a greater cross-section;

fitting onto said core a jacket having a substantially cylindrical external surface and an internal surface, leaving an interstice between the internal surface of said jacket and an external surface of said core, centering said jacket and said core relative to each other;

introducing a substantially fluid hardening resin material into said interstice so as to form a layer of hardened resin material fixed to the internal surface of said jacket, said jacket and said layer of hardened material forming said sleeve;

extracting axially with respect to each other said jacket, with the layer of hardened material adhering to the jacket, and said core.

2. Method according to claim 1, wherein said core has a substantially frustoconical external surface and said sleeve has an internal surface onto which said layer of fluid hardening resin material is applied, substantially cylindrical and with a greater diameter than the maximum diameter of the frustoconical surface of said core.

3. Method according to claim 1, wherein said central core, before casting, is covered with a separating agent.

4. Method according to claim 1, wherein casting of the fluid hardening resin material is performed in a substantially vertical condition of assembly comprising the sleeve and the core centered relative to each other, with the end of said core with a smaller diameter at top.

5. Method according to claim 1, further comprising an annular centering and sealing flange mounted between the cylindrical sleeve and the end of said core with a larger diameter.

6. Method according to claim 1, further comprising centering segments applied between said sleeve and the end of said core with a smaller diameter, casting of the fluid hardening resin material being performed between spaced segments.

7. Method according to claim 1, wherein after hardening of the material, the external surface of said sleeve is processed so as to produce embossing reliefs thereon.

8. Method according to claim 1, wherein after hardening of the material, the external surface of the core is ground and subsequently engraved so as to produce embossing reliefs.

9. Method according to claim 7 or 8, wherein, after hardening of the material, centering means are disassembled, said sleeve and said core are extracted one from the other and again inserted one onto the other by means of forcing for grinding and/or for formation of embossing reliefs.

10. Method according to claim 9, wherein before renewed relative mounting of the sleeve and the core, the external surface of the core is cleaned of any residues of hardened material and/or separating agents.

11. Method according to claim 1, wherein said hardening material is a resin.

12. Method according to claim 11, wherein said hardening material is a dual-component epoxy resin.

* * * * *

UNITED STATES PATENT AND TRADEMARK OFFICE

CERTIFICATE OF CORRECTION

PATENT NO. : 7,357,892 B2
APPLICATION NO. : 10/496570
DATED : April 15, 2008
INVENTOR(S) : Giulio Betti et al.

It is certified that error appears in the above-identified patent and that said Letters Patent is hereby corrected as shown below:

On the Title Page,
(30) "Foreign Application Priority Data
Nov. 26, 2001 (IT) . . . . .FI2004A0224" should read
-- Foreign Application Priority Data
Nov. 26, 2001 (IT) . . . . .FI2001A0224 --.

Column 3,
Line 23, "a clichéin the" should read -- a cliché in the --.

Column 11,
Line 15, "sleeves intended, for" should read -- sleeves intended for --.

Signed and Sealed this

Second Day of June, 2009

JOHN DOLL
*Acting Director of the United States Patent and Trademark Office*